US012296258B2

(12) United States Patent
Setia et al.

(10) Patent No.: US 12,296,258 B2
(45) Date of Patent: May 13, 2025

(54) METHODS, SYSTEMS AND COMPUTER PROGRAM PRODUCTS FOR FINE GRAINED CLOUD GAMING SESSION CONTROL

(71) Applicant: NOW.GG, INC., Campbell, CA (US)

(72) Inventors: Lokesh Setia, Gurugram (IN); Nitin Kalra, Gurugram (IN); Ravi Prakash, Gurugram (IN); Ashish Pathak, Haldwani (IN)

(73) Assignee: NOW.GG, INC., Campbell, CA (US)

( * ) Notice: Subject to any disclaimer, the term of this patent is extended or adjusted under 35 U.S.C. 154(b) by 90 days.

(21) Appl. No.: 17/939,480

(22) Filed: Sep. 7, 2022

(65) Prior Publication Data

US 2023/0074240 A1 Mar. 9, 2023

Related U.S. Application Data

(60) Provisional application No. 63/241,763, filed on Sep. 8, 2021.

(51) Int. Cl.
*A63F 13/355* (2014.01)
(52) U.S. Cl.
CPC .................. *A63F 13/355* (2014.09)
(58) Field of Classification Search
CPC ...... A63F 13/355; A63F 13/352; A63F 13/30; A63F 13/332; H04L 67/131; H04N 21/6125
See application file for complete search history.

(56) References Cited

U.S. PATENT DOCUMENTS

| | | | |
|---|---|---|---|
| 2016/0192012 A1* | 6/2016 | Rao | H04N 21/4828 725/110 |
| 2017/0185692 A1* | 6/2017 | Boudville | G06F 16/9554 |
| 2019/0091567 A1* | 3/2019 | Huffman | A63F 13/73 |
| 2019/0158353 A1* | 5/2019 | Johnson | G06F 16/95 |
| 2019/0240572 A1* | 8/2019 | Perry | A63F 13/60 |
| 2020/0275133 A1 | 8/2020 | Ni et al. | |

FOREIGN PATENT DOCUMENTS

WO 2021173151 A1 9/2021

* cited by examiner

*Primary Examiner* — William H McCulloch, Jr.
*Assistant Examiner* — Ankit B Doshi
(74) *Attorney, Agent, or Firm* — The Webb Law Firm

(57) ABSTRACT

The present invention relates to provisioning of cloud based software gaming services. The systems and methods of the present invention enable users who are presented with targeted content relating to cloud based software games to be able to experience the targeted content in an efficient, interactive and user friendly manner—while simultaneously restricting the user experience only to the targeted content, and avoiding having the user navigate the entire game play interface or the entire game play flow in chronological order. The invention offers solutions for using embedded links and/or deep links within targeted content delivered to client terminals, for the purposes of implementing fine grained gaming session control between a cloud gaming server and the client control for cloud based delivery of software gaming services to the client terminal.

11 Claims, 6 Drawing Sheets

METHODS, SYSTEMS AND COMPUTER PROGRAM PRODUCTS FOR FINE GRAINED CLOUD GAMING SESSION CONTROL

CROSS-REFERENCE TO RELATED APPLICATION

This application claims priority to U.S. Provisional Patent Application No. 63/241,763 filed Sep. 8, 2021, the disclosure of which is hereby incorporated by reference in its entirety.

BACKGROUND OF THE INVENTION

Field of the Invention

The present invention relates to provisioning of cloud based software gaming services. In particular, the present invention provides methods, systems and computer program products for fine grained cloud gaming session control.

Description of Related Art

With the increase in availability of affordable computing hardware, it has become commonplace for individuals to use computing devices or data processing devices for accessing cloud based, or network based, services.

In a typical cloud based software services environment, one or more client terminals may interface through a network (such as the Internet), with a server (or with any other computing device located within the cloud), which is configured to provide cloud based service(s) to a requesting client terminal. In providing the cloud based software service(s), a software application required by a requesting client terminal is installed and run on the server, and video and audio output data from the software application is streamed to and rendered on the requesting client terminal. The inputs received from a user or operator of the requesting client terminal are in turn transmitted back to the server and are used to control execution of the software application that is running on the server.

Cloud based software services environments have been found to be particularly useful to implement cloud based software gaming services. For example, a game application software is installed and run on a cloud based computing device configured to run the game application software. The game application software is run on the computing device and video and audio game play data is streamed from the computing device to a client terminal, where it is rendered for display and/or audio playback. A game player who is operating a client terminal uses the interface controls of the client terminal to provide game play inputs—which are streamed back to the computing device on which the game application software is being executed and is used as game play control inputs for the game software that is being run on said computing device.

In view of the growing demand for cloud based software gaming services, there is a growing need for effective solutions for advertising or targeting delivery of game content to users for creating awareness and interest in new cloud based software games or in new offerings within cloud based software games. There is additionally a need for enabling users who are presented with advertising content or push marketing content or other targeted content relating to cloud based software games to be able to experience such content in an efficient, interactive and user friendly manner—while simultaneously restricting the user experience only to the such content, and avoiding having the user navigate the entire game play interface or the entire game play flow in chronological order.

SUMMARY OF THE INVENTION

The invention enables advertising or targeted delivery of cloud based software game content to users for creating awareness and interest in new cloud based software games or new offerings within cloud based software games. The invention further enables users who are presented with advertising content or targeted content relating to cloud based software games, to experience or sample advertised game play content in an efficient, interactive and user friendly manner. The invention optionally enables restricting a user experience only to the advertised or targeted game play content, and further, may enable the user to avoid navigating the entire game play interface or the entire game play flow in chronological order. In certain embodiments, the invention implements one or more of the above through deep linking based cloud gaming session control.

In an embodiment, the invention provides a method for fine grained cloud gaming session control comprising (i) receiving at a client terminal, targeted content, wherein the targeted content comprises (a) game content corresponding to a cloud based gaming software application, for display on a client terminal display, and (b) an embedded network communication link comprising (1) a URL identifying a network location of a cloud gaming server from which the cloud based gaming software application can be accessed, (2) a first identifier comprising a cloud based gaming software application identifier that uniquely identifies the cloud based gaming software application, (3) a second identifier, wherein said second identifier is recognizable by the cloud gaming server as an identifier of deep link parameter(s), and (4) one or more game play parameters that are associated with the second identifier, wherein said game play parameters enable selection of game play sensory data generated by an instance of the cloud based gaming software application, for transmission from the cloud gaming server to the client terminal, (ii) rendering on the client terminal, a clickable instance of the game content, wherein the rendered clickable instance of the game content includes the embedded network communication link, and (iii) responding to a user input that clicks or selects the clickable instance of the game content, by transmitting to the cloud gaming server identified by the URL (c) the first identifier, (d) the second identifier, and (e) the one or more game play parameters.

The method may further comprise implementing at the cloud gaming server, the steps of (i) receiving the first identifier, the second identifier, and the one or more game play parameters, (ii) selecting from among a plurality of selectable game play options associated with the identified cloud based gaming application software, a set of game play options identified based on the one or more game play parameters that have been received from the client terminal, (iii) initiating a cloud based instance of the cloud based gaming software application, wherein is initiated after the cloud gaming server receives the first identifier, the second identifier, and the one or more game play parameters transmitted from the client terminal, and (iv) initiating streaming of game play data generated by the cloud based instance of the cloud based gaming software application, from the cloud gaming server to the client terminal, wherein the streamed game play data is determined by the selected set of game play options.

In a method embodiment, the embedded network communication link further comprises one or more query string based parameters that are not linked or associated with the second identifier.

In another method embodiment, the one or more game play parameters that are included within the embedded network communication link comprise any one or more parameters that the cloud gaming server is configured to rely on for selecting game play audio data or game play video data or game play sensory data, from among a set of selectable game play data, for transmission to the client terminal.

In a particular method embodiment, the one or more query string based parameters that are not linked or associated with the second identifier comprise parameters that include attribution information that identifies to the cloud gaming server, a targeted content source server that requires to be credited for the clickable instance of the game content that has been rendered on the client terminal.

The invention additionally provides a system for fine grained cloud gaming session control comprising a processor implemented client terminal, configured for performing the steps of (i) receiving at a client terminal, targeted content, wherein the targeted content comprises (a) game content corresponding to a cloud based gaming software application, for display on a client terminal display, and (b) an embedded network communication link comprising (1) a URL identifying a network location of a cloud gaming server from which the cloud based gaming software application can be accessed, (2) a first identifier comprising a cloud based gaming software application identifier that uniquely identifies the cloud based gaming software application, (3) a second identifier, wherein said second identifier is recognizable by the cloud gaming server as an identifier of deep link parameter(s), and (4) one or more game play parameters that are associated with the second identifier, wherein said game play parameters enable selection of game play sensory data generated by an instance of the cloud based gaming software application, for transmission from the cloud gaming server to the client terminal, (ii) rendering on the client terminal, a clickable instance of the game content, wherein the rendered clickable instance of the game content includes the embedded network communication link, and (iii) responding to a user input that clicks or selects the clickable instance of the game content, by transmitting to the cloud gaming server identified by the URL (c) the first identifier, (d) the second identifier, and (e) the one or more game play parameters.

The system may be further configured for implementing at the cloud gaming server, the steps of (i) receiving the first identifier, the second identifier, and the one or more game play parameters, (ii) selecting from among a plurality of selectable game play options associated with the identified cloud based gaming application software, a set of game play options identified based on the one or more game play parameters that have been received from the client terminal, (iii) initiating a cloud based instance of the cloud based gaming software application, wherein is initiated after the cloud gaming server receives the first identifier, the second identifier, and the one or more game play parameters transmitted from the client terminal, and (iv) initiating streaming of game play data generated by the cloud based instance of the cloud based gaming software application, from the cloud gaming server to the client terminal, wherein the streamed game play data is determined by the selected set of game play options.

In a system embodiment, the embedded network communication link further comprises one or more query string based parameters that are not linked or associated with the second identifier.

In another system embodiment, the one or more game play parameters that are included within the embedded network communication link comprise any one or more parameters that the cloud gaming server is configured to rely on for selecting game play audio data or game play video data or game play sensory data, from among a set of selectable game play data, for transmission to the client terminal.

In a particular system embodiment, the one or more query string based parameters that are not linked or associated with the second identifier comprise parameters that include attribution information that identifies to the cloud gaming server, a targeted content source server that requires to be credited for the clickable instance of the game content that has been rendered on the client terminal.

The invention also provides a computer program product for fine grained cloud gaming session control, comprising a non-transitory computer readable medium having a computer readable program code embodied therein, the computer readable program code comprising instructions for implementing the steps of (i) receiving at a client terminal, targeted content, wherein the targeted content comprises (a) game content corresponding to a cloud based gaming software application, for display on a client terminal display, and (b) an embedded network communication link comprising (1) a URL identifying a network location of a cloud gaming server from which the cloud based gaming software application can be accessed, (2) a first identifier comprising a cloud based gaming software application identifier that uniquely identifies the cloud based gaming software application, (3) a second identifier, wherein said second identifier is recognizable by the cloud gaming server as an identifier of deep link parameter(s), and (4) one or more game play parameters that are associated with the second identifier, wherein said game play parameters enable selection of game play sensory data generated by an instance of the cloud based gaming software application, for transmission from the cloud gaming server to the client terminal, (ii) rendering on the client terminal, a clickable instance of the game content, wherein the rendered clickable instance of the game content includes the embedded network communication link, and (iii) responding to a user input that clicks or selects the clickable instance of the game content, by transmitting to the cloud gaming server identified by the URL (c) the first identifier, (d) the second identifier, and (e) the one or more game play parameters.

DESCRIPTION OF THE INVENTION

Figure 1:
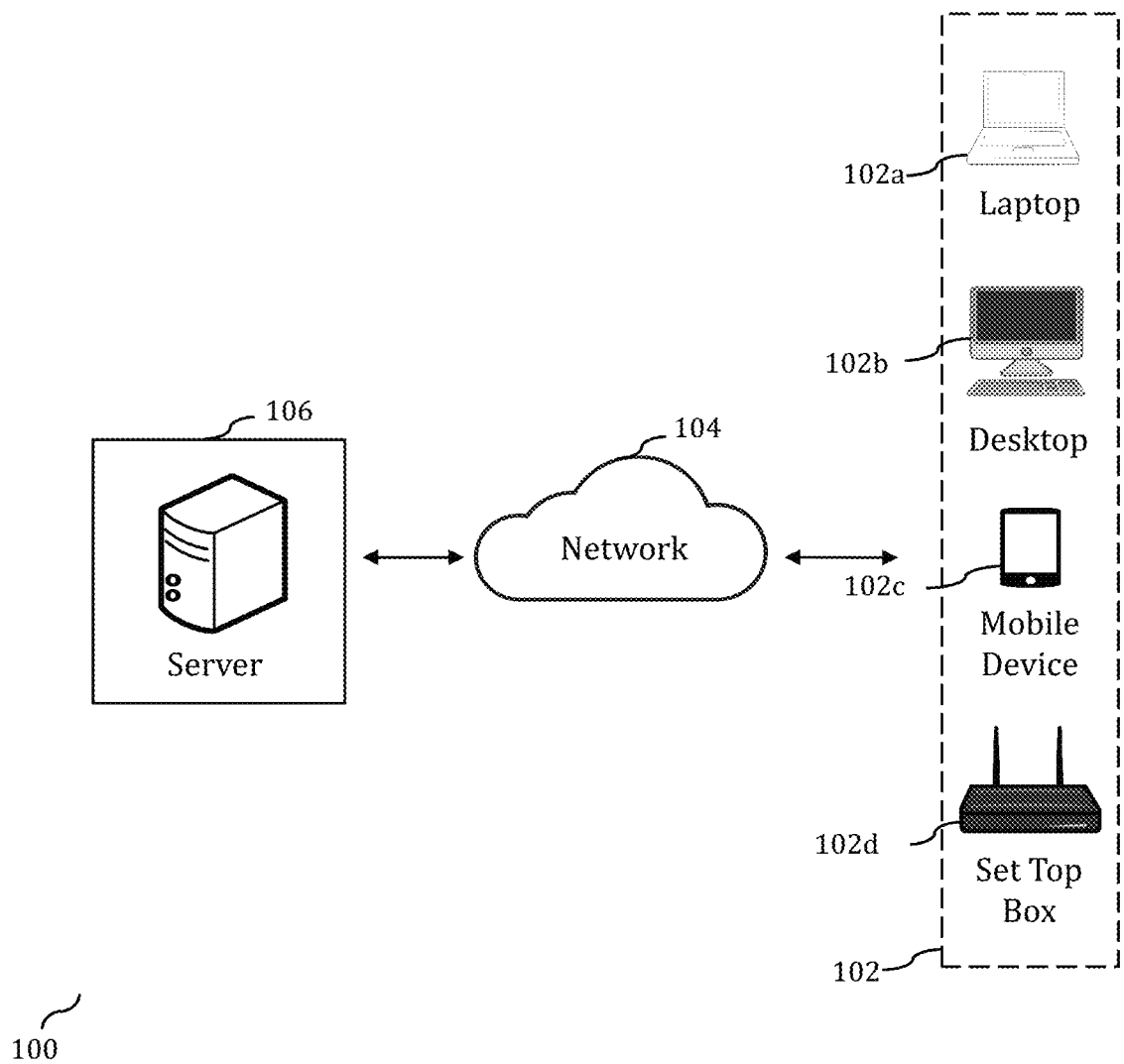
FIGS. 1 and 2 illustrate system environments of a kind that may be used to implement the teachings of the present invention.

FIG. 1 illustrates a system environment 100 of a kind that may be used for implementing cloud based, or network based, services in accordance with the teachings of the present invention. System environment 100 comprises one or more client terminals 102 (for example, any of laptop 102a, desktop 102b, mobile device 102c and/or set top box 102d) interfacing through network 104, with a server 106 (which server may comprise any cloud based computing device). Server 106 may be configured to provide cloud based service(s) to a requesting client terminal 102, wherein a software application required by client terminal 102 is installed and run on server 106, and video and audio output data from the software application is streamed to and rendered on client terminal 102. The inputs received from a user or operator of the client terminal 102 are in turn transmitted back to server 106 and are used to control execution of the software application that is running on the server 106.

In a cloud based gaming environment, a game application software is installed and run on a cloud based computing device configured to run the game application software—wherein the cloud based computing device may be integrated or coupled with server 106. The game application software is run on the computing device and video and audio game play data is streamed from the computing device (optionally through server 106) to a client terminal 102, where it is rendered for display and/or audio playback. A game player who is operating client terminal 102 uses the interface controls of client terminal 102 to provide game play inputs—which are streamed back to the computing device on which the game application software is being executed and is used as game play control inputs for the game application software that is being run on said computing device. As a result, game players from any location can play a video game or a computer game without having to secure specialized video game consoles, software or graphics processing hardware—and relying instead on securing on-demand execution of the game application software by a cloud based server or cloud based computing device.

Figure 2:
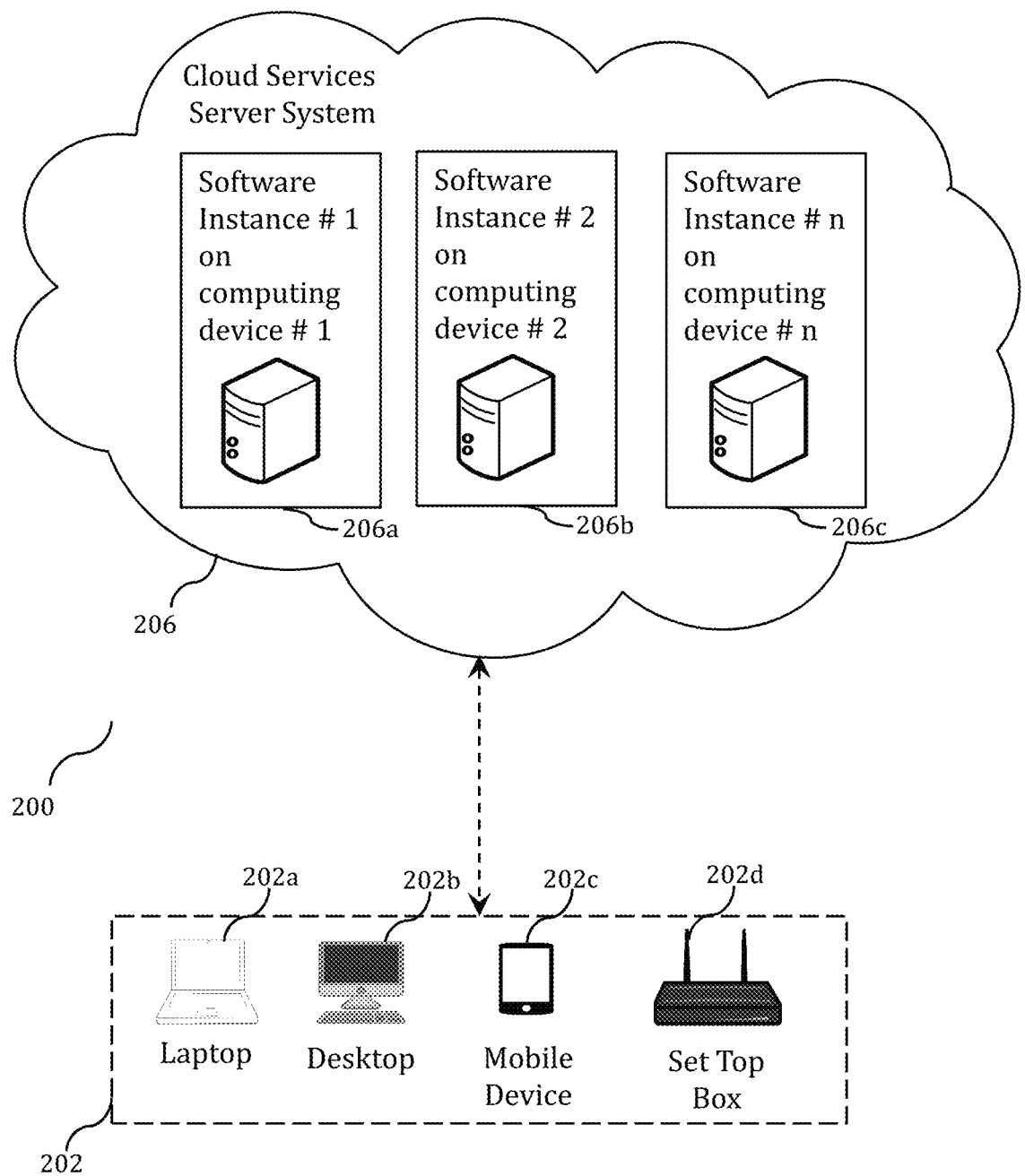

FIG. 2 illustrates a system environment 200—which comprises one or more client terminals 202 (for example, any of laptop 202a, desktop 202b, mobile device 202c and/or set top box 202d) interfacing through a communication network such as a data network or the internet (not shown), with a cloud services server system 206. The cloud services server system 206 may comprise (or may be coupled with) a plurality of discrete or distinct computing systems (computing device #1, computing device #2 upto computing device #n)—each of which may be configured to be provisioned with, and to instantiate and run a discrete instance of one or more game application software(s). As a result, cloud services server system 206 may utilize the plurality of discrete or distinct computing systems to simultaneously run game application software instance #1 (206a), game application software instance #2 (206b), upto game application software instance #n (206c)—such that video and/or audio data from each of these game application software instances 206a to 206c may be streamed to one or more requesting client terminals 202a to 202d.

By way of an example:
client terminal 202a may request cloud services server system 206 for cloud based execution of a first game application software—and cloud services server system 206 may respond by (i) instantiating an instance of this first game application software (game application software instance #1) to run on a first computing device (hardware device #1), and (ii) streaming video and/or audio data from the instance of the first game application software to client terminal 202a.
client terminal 202b may request cloud services server system 206 for cloud based execution of a second game application software (which may be the same as the first game application software, or may comprise a different game application software)—and cloud services server system 206 may respond by (i) instantiating an instance of this second game application software (game application software instance #2) to run on a second computing device (computing device #2), and (ii) streaming video and/or audio data from the instance of the second game application software to client terminal 202b client terminal 202c may request cloud services server system 206 for cloud based execution of an $n^{th}$ game application software (which may be the same as either of the first or second game application software(s), or may be different from both)—and cloud services server system 206 may respond by (i) instantiating an instance of this $n^{th}$ game application software (game application software instance #n) to run on a $n^{th}$ computing device (computing device #n), and (ii) streaming video and/or audio data from the instance of the $n^{th}$ game application software to client terminal 202c.

For the purposes of this description "targeted content" shall mean any advertisement, network link, uniform resource locator, document, push marketing content or other data, that describes or relates to content associated with or offered by a cloud based software gaming service.

When targeted content for a cloud based software gaming service is displayed on a client terminal 202, the displayed targeted content may be rendered on the client terminal 202 such that it includes an embedded link that directs a web browser (i.e. a web browser that is implemented within the client terminal 202) to a cloud services server system 206 that is configured to host and/or implement a cloud based instance of the game application software for cloud based execution and delivery to the client terminal 202. However, simply embedding a uniform resource locator that identifies the cloud services server system 206 and/or a location at which an executable instance of the game application software is hosted within the cloud services server system 206 is found to be unsatisfactory—since every user clicking on the link would require the game to be launched from the default initial game play state—and the user would thereafter have to experience the entire game play launch and flow in chronological order, including having to select a character or avatar, equip the character or avatar, and then starting the game from the initial game play state. This makes it difficult to effectively advertise or market specific game play aspects—for example, new levels, new characters, or new objects or powers for those characters.

The present invention addresses this requirement by using deep links to implement fine grained gaming session control in connection with cloud based software gaming services.

In the context of software applications (for example, mobile device software applications), deep linking consists of launching a second software application directly from within a first software application. The first software application presents a user with a uniform resource identifier (URI) that links to a specific location within the second software application—such that clicking or selecting this URI causes the first software application to launch the second software application, and to simultaneously pass to the second software application one or more arguments or parameters that cause the second software application to present specific content or a specific interface to the user.

For example, in the context of mobile device software applications—which tend to have a defined and specific content focus—it is often necessary or desirable to switch from one mobile device software application to another to meet different information needs. To avoid requiring a user to close or exit a current mobile device software application, navigate to an interface to access a different mobile device software application, launch the new mobile device software application, and then provide input to the new mobile device software application to meet the information need, deep linking enables the user to click on a link within a first mobile device software application, wherein the deep link launches a second mobile device software application, and additionally passes context information to the second mobile device software application, so that the user is presented with a targeted response or targeted content from this second mobile device software application upon launch. For example, a user may use a maps software application to identify nearby restaurants, and may want to make a reservation at one of the restaurants shown in the map interface. Instead of having to separately launch a restaurant reservation application and make a reservation through such restaurant reservation application, the user may instead click or select a deep link displayed in the maps software application. The deep link selected within the maps software application launches the restaurant reservation application, and simultaneously passes (from the maps software application to the restaurant reservation application) one or more argument strings identifying the restaurant which the user has selected in the maps application software. Based on the received argument strings, the restaurant reservation application presents the user with the reservation page for the desired restaurant, without the user having to first navigate and select the restaurant within the restaurant reservation application.

Figure 3:
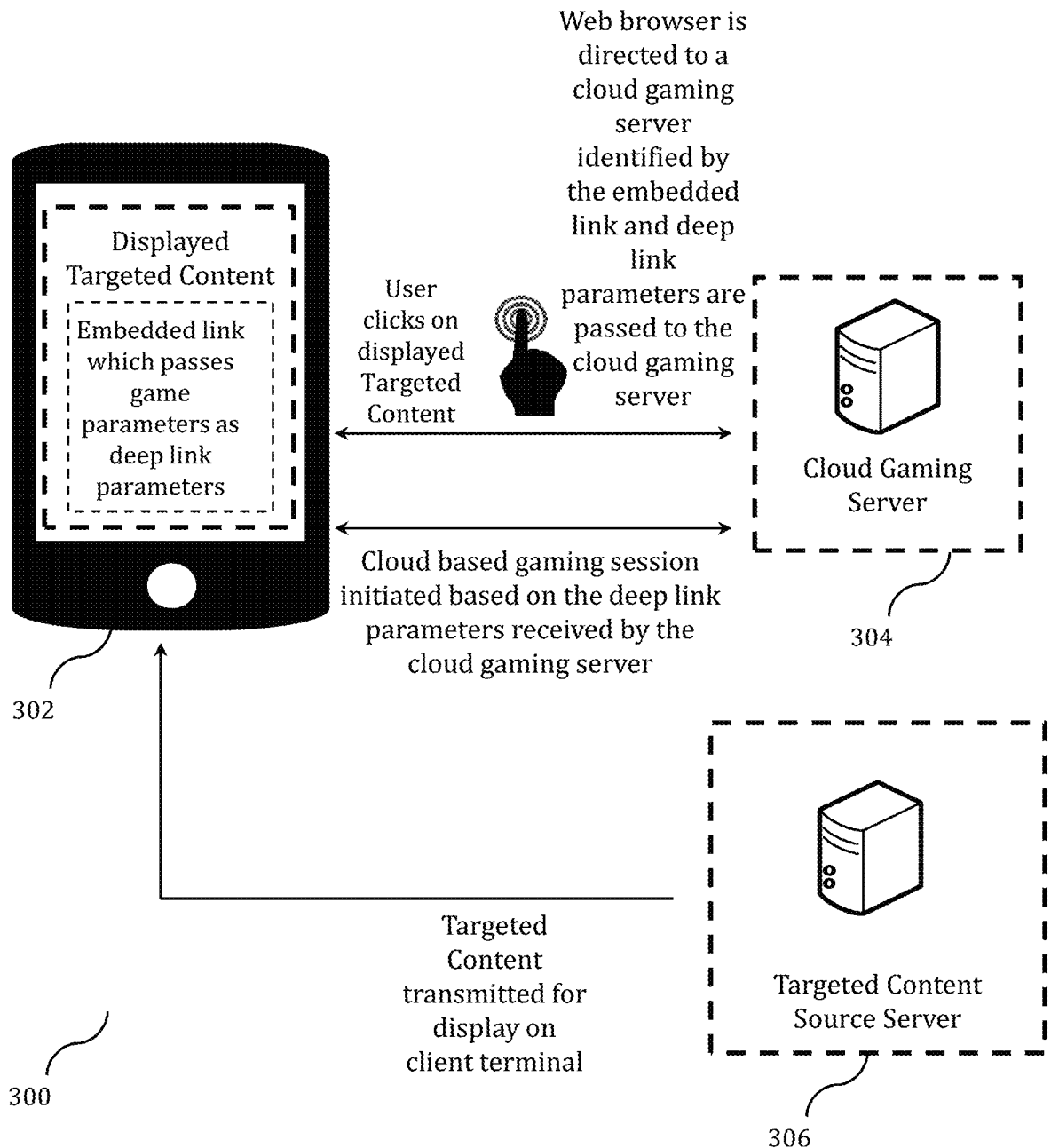
FIG. 3 illustrates a process flow within a system environment for implementing deep linking based cloud gaming session control, in accordance with the teachings of the present invention.

FIG. 3 illustrates a process flow within a system environment 300 for implementing deep linking based cloud gaming session control, in accordance with the teachings of the present invention.

As shown in system environment 300 of FIG. 3, targeted content for a cloud based game (for example targeted content for a new character or new playable avatar available within a cloud based game application software) is displayed on a display of a client terminal 302 (for example, on the display of a mobile device).

In the embodiment illustrated in FIG. 3, the targeted content (or data, content and/or instructions for displaying the targeted content on the client terminal 302) may be transmitted from targeted content source server 306 to the client terminal 302—responsive to which, client terminal 302 may display the targeted content on a display. In an embodiment, the targeted content source server 306 is a discrete data processing entity that is distinct from client terminal 302 and from a cloud gaming server 304 (that is described in more detail hereinbelow).

The targeted content that is displayed includes an embedded link. The embedded link may take the form of a hypertext markup language (HTML) hyperlink or any other form of hyperlink. In an embodiment, the embedded link may include one or more of (i) a uniform resource locator (URL) or other address identifier identifying a network location of a cloud gaming server 304 at which cloud based gaming software application (that is the subject of the targeted content that is displayed) can be accessed, (ii) a first identifier comprising a cloud based gaming software application identifier that uniquely identifies the cloud based gaming software application (iii) at least a second identifier that the cloud gaming server 304 is configured to recognize as an identifier of deep link parameter(s), (iv) one or more game play parameters that are linked or associated with the second identifier—and which are therefore recognized by the cloud gaming server 304 as comprising deep link parameter(s), and optionally (v) one or more query string based parameters for transmission to the cloud gaming server 304, wherein said one or more query string based parameters are not linked or associated with the second identifier—and which are therefore not recognized by the cloud gaming server 304 as comprising deep link parameter(s).

In response to a user clicking, tapping or interacting with the targeted content or hyperlink through client terminal 302, a web browser implemented within client terminal 302 is directed to the cloud gaming server 304 that is identified by the embedded link—for example, based on the uniform resource locator (URL) or other address identifier identifying a network location of the cloud gaming server 304 at which the cloud based gaming software application can be accessed. The cloud gaming server 304 may be identified based on the uniform resource locator (URL) or other indicator of an address of the cloud gaming server 304, that is included within the embedded link. Additionally, clicking, tapping or interacting with the targeted content or the embedded link through client terminal 302 results in the client terminal 302 transmitting to the cloud gaming server 304, one or more of the additional data parameters stored within the embedded link—including one or more of (i) the first identifier comprising a cloud based gaming software application identifier that uniquely identifies the cloud based gaming software application, (ii) the second identifier that the cloud gaming server 304 is configured to recognize as an identifier of deep link parameter(s), (iii) the one or more game play parameters that are linked or associated with the second identifier—and which are therefore recognized by the cloud gaming server 304 as comprising deep link parameter(s), and optionally (iv) one or more query string based parameters for transmission to the cloud gaming server 304, wherein said one or more query string based parameters are not linked or associated with the second identifier—and which are therefore not recognized by the cloud gaming server 304 as comprising deep link parameter(s).

Based on the above additional data parameters from within the embedded link (within the targeted content that has been displayed) that are received at cloud gaming server 304, cloud gaming server 304 initiates execution of an instance of the cloud based gaming software application identified by the additional data parameter(s) (i.e. identified by the first identifier within the embedded link), and initiates a communication session between cloud gaming server 304 and client terminal 302—wherein game play data from the executed instance of the cloud based gaming software application is transmitted between cloud gaming server 304 and client terminal 302 over the initiated communication session.

The one or more game play parameters (that are linked or associated with the second identifier) which are included within the embedded link, and which are subsequently transmitted to cloud gaming server 304, may comprise any one or more parameters that cloud gaming server 304 is configured to recognize and use for selecting game play audio data or game play video data or any other form of game play sensory data, from among a set of selectable game play data corresponding to the instance of the cloud based gaming software application, for transmission to client terminal 302. Thus, by selectively including such game play parameters within the embedded link in targeted content for a cloud based gaming software application, and by transmitting such game play parameters to a cloud gaming server 304 when the embedded link is clicked, selected or otherwise activated, the invention enables selective fine grained control of game play data that is delivered from the cloud gaming server to a client terminal during a cloud based gaming session.

It would be noted from the above that the embedded link may additionally include one or more query string based parameters for transmission to the cloud gaming server 304, that are not linked or associated with the second identifier—and which are therefore not recognized by the cloud gaming server 304 as comprising deep link parameter(s). In certain embodiments, these query string based parameters may include parameters that are not specific to the cloud based gaming software that is being advertised and/or to selection of game play data associated with the cloud based gaming software—and may instead include any other parameters or arguments that may require to be passed, or that may be optionally passed, to cloud gaming server 304. It will be noted that these query string based parameters are not linked or associated with the second identifier—thereby enabling the cloud gaming server to differentiate between (i) parameters within the embedded link that are associated with the second identifier and which cloud gaming server 304 is therefore configured to use for selecting game play audio data or game play video data or any other form of game play sensory data, from among a set of selectable game play data corresponding to the instance of the cloud based gaming software application, for transmission to client terminal 302, and (ii) parameters within the embedded link that are not associated with the second identifier, and which cloud gaming server 304 may use for purposes other than for selecting game play audio data or game play video data or any other form of game play sensory data, from among a set of selectable game play data corresponding to the instance of the cloud based gaming software application, for transmission to client terminal 302. In an exemplary embodiment, parameters within the embedded link that are not associated with the second identifier, is parameters that include attribution information to inform the cloud gaming server 304 about the targeted content source server 306 that requires to be credited for the clicked or selected targeted content.

Figure 4:
FIGS. 4 and 5 are flowcharts illustrating methods for implementing deep linking based cloud gaming session control, in accordance with the teachings of the present invention.
Figure 5:
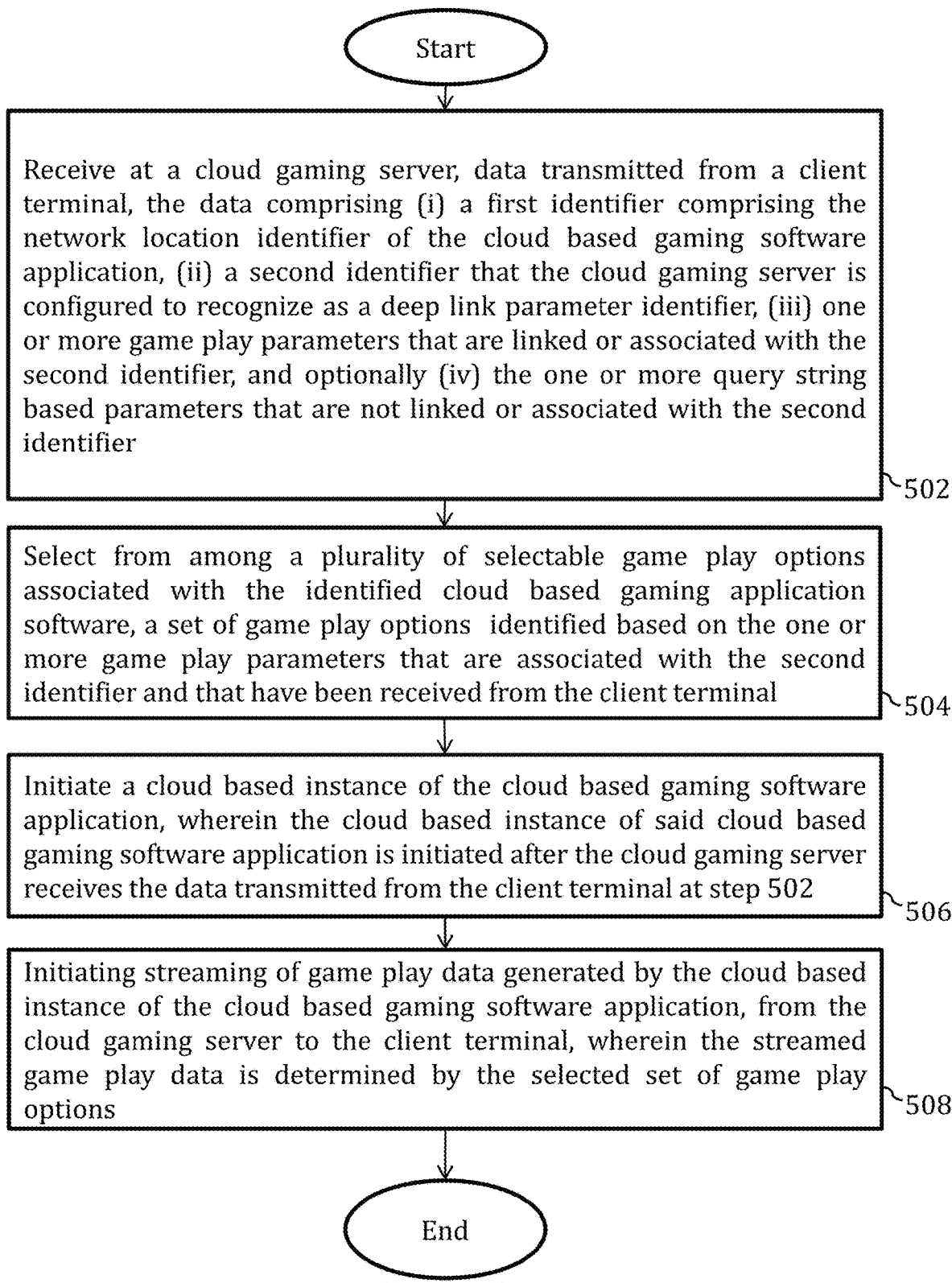

FIGS. 4 and 5 are flowcharts illustrating methods for implementing deep linking parameter based cloud gaming session control, in accordance with the teachings of the present invention.

FIG. 4 illustrates method steps of the invention that are implemented at a client terminal for the purposes of instantiating an instance of a cloud based gaming software application in response to clicking, selecting or otherwise activating an embedded link within targeted content that has been displayed on the client terminal. In an embodiment, the method of FIG. 4 may be implemented within system environment 300 of FIG. 3, and in a specific embodiment, within client terminal 302 of FIG. 3.

Step 402 comprises receiving targeted content data for display on a client terminal display. The targeted content comprises targeted game content for a cloud based gaming software application (for example targeted content for a new character or new playable avatar within a cloud based gaming software application). The targeted game content may be transmitted to client terminal 302 from a targeted content source server 306, for being displayed on a display of a client terminal 302 (for example, on the display of a mobile device).

The targeted content received at step 402 may additionally include data representing or defining an embedded network communication link, the embedded network communication link comprising one or more of (i) a uniform resource locator (URL) or other address identifier identifying a network location of a cloud gaming server 304 at which the cloud based gaming software application can be accessed, (ii) a first identifier comprising a cloud based gaming software application identifier that uniquely identifies the cloud based gaming software application (iii) a second identifier that the cloud gaming server 304 is configured to recognize as an identifier of deep link parameter(s), (iv) one or more game play parameters that are linked or associated with the second identifier—and which are therefore recognized by the cloud gaming server 304 as comprising deep link parameter(s), and optionally (v) one or more query string based parameters for transmission to the cloud gaming server 304, wherein said one or more query string based parameters are not linked or associated with the second identifier—and which are therefore not recognized by the cloud gaming server 304 as comprising deep link parameter(s).

Step 404 comprises rendering on the client terminal (in an embodiment, on a display of the client terminal display), a clickable instance of the targeted game content, wherein the rendered clickable instance of the targeted game content includes the embedded link comprising one or more of (i) the uniform resource locator (URL) or other address identifier identifying a network location of a cloud gaming server 304 at which an cloud based gaming software application (that is identified within the targeted content) can be accessed, (ii) the first identifier comprising a cloud based gaming software application identifier that uniquely identifies the cloud based gaming software application (iii) the second identifier that the cloud gaming server 304 is configured to recognize as an identifier of deep link parameter(s), (iv) the one or more game play parameters that are linked or associated with the second identifier—and which are therefore recognized by the cloud gaming server 304 as comprising deep link parameter(s), and optionally (v) the one or more query string based parameters for transmission to the cloud gaming server 304, wherein said one or more query string based parameters are not linked or associated with the second identifier—and which are therefore not recognized by the cloud gaming server 304 as comprising deep link parameter(s).

In an embodiment, the embedded link within the the rendered clickable instance of the targeted game content may take the form of a hypertext markup language (HTML) hyperlink or any other form of hyperlink.

Step 406 comprises responding to a user input that clicks or selects the clickable instance of the targeted game content, by transmitting to the cloud gaming server identified by the URL (i) the first identifier comprising a cloud based gaming software application identifier that uniquely identifies the cloud based gaming software application, (ii) the second identifier that the cloud gaming server 304 is configured to recognize as an identifier of deep link parameter(s), (iii) the one or more game play parameters that are linked or associated with the second identifier—and which are therefore recognized by the cloud gaming server 304 as comprising deep link parameter(s), and optionally (iv) one or more query string based parameters for transmission to the cloud gaming server 304, wherein said one or more query string based parameters are not linked or associated with the second identifier—and which are therefore not recognized by the cloud gaming server 304 as comprising deep link parameter(s).

In an embodiment, the one or more game play parameters (that are linked or associated with the second identifier) which are included within the embedded link, may comprise any one or more parameters that a cloud gaming server is configured to use for selecting game play audio data or game play video data or any other form of game play sensory data, from among a set of selectable game play data corresponding to an instance of the cloud based gaming software application, for transmission back to the client terminal 302. By selectively including such game play parameters within the embedded link in targeted content for a cloud based gaming software application, and by transmitting such game play parameters to a cloud gaming server 304 when the embedded link is clicked, selected or otherwise activated, the method enables selective fine grained control of game play data that is delivered from the cloud gaming server to a client terminal during a cloud based gaming session.

The embedded link may additionally include one or more query string based parameters, which although intended for transmission to a cloud gaming server, are nevertheless not associated with the second identifier. These query string based parameters may include parameters that are not specific to the cloud based gaming software that is being advertised and/or to selection of game play data associated with the cloud based gaming software—and may instead include any other parameters or arguments that may require to be passed or that may be optionally passed to cloud gaming server 304. It will be noted that these query string based parameters are not associated with the second identifier—thereby enabling a cloud gaming server to differentiate between (i) parameters within the embedded link that are linked or associated with the second identifier and which the cloud gaming server 304 is therefore configured to use for selecting game play audio data or game play video data or any other form of game play sensory data, from among a set of selectable game play data corresponding to the instance of the cloud based gaming software application, for transmission to client terminal 302, and (ii) parameters within the embedded link that are not linked or associated with the second identifier, and which the cloud gaming server 304 may use for purposes other than for selecting game play audio data or game play video data or any other form of game play sensory data, from among a set of selectable game play data corresponding to the instance of the cloud based gaming software application, for transmission to client terminal 302—for example parameters that include attribution information to inform the cloud gaming server 304 about targeted content source server that requires to be credited for the clicked or selected targeted content.

FIG. 5 illustrates the method steps of the invention that are implemented at a cloud gaming server 304 for the purposes of instantiating an instance of a cloud based gaming software application in response to clicking, selecting or otherwise activating an embedded link within targeted content that has been displayed on a client terminal 302. In an embodiment, the method of FIG. 5 may be implemented within system environment 300 of FIG. 3, and in a specific embodiment, within the cloud gaming server 304 of FIG. 3.

Step 502 comprises receiving at a cloud gaming server 304, data transmitted from a client terminal 302, the data comprising (i) a first identifier comprising a cloud based gaming software application identifier that uniquely identifies a cloud based gaming software application, (ii) a second identifier that the cloud gaming server 304 is configured to recognize as an identifier of deep link parameter(s), (iii) one or more game play parameters that are linked or associated with the second identifier—and which are therefore recognized by the cloud gaming server 304 as comprising deep link parameter(s), and optionally (iv) one or more query string based parameters, wherein said one or more query string based parameters are not linked or associated with the second identifier—and which are therefore not recognized by the cloud gaming server 304 as comprising deep link parameter(s).

The one or more game play parameters (that are linked or associated with the second identifier) which are included within the embedded link, may comprise any one or more parameters that a cloud gaming server is configured to use for selecting game play audio data or game play video data or any other form of game play sensory data, from among a set of selectable game play data corresponding to an instance of the cloud based gaming software application, for transmission back to the client terminal 302. By transmitting such game play parameters to a cloud gaming server 304 when the embedded link is clicked, selected or otherwise activated, the method enables selective fine grained control of game play data that is delivered from the cloud gaming server to a client terminal during a cloud based gaming session.

The query string based parameters transmitted to cloud gaming server 304 and that are not linked or associated with the second identifier may include parameters that are not specific to the cloud based gaming software that is being advertised and/or to selection of game play data associated with the cloud based gaming software. These query string parameters may instead include any other parameters or arguments that may require to be passed or that may be optionally passed to cloud gaming server 304. Since these query string based parameters are not associated with the second identifier—the cloud gaming server 304 is enabled to differentiate between (i) parameters within the embedded link that are linked or associated with the second identifier and which the cloud gaming server 304 is therefore configured to use for selecting game play audio data or game play video data or any other form of game play sensory data, from among a set of selectable game play data corresponding to the instance of the cloud based gaming software application, for transmission to client terminal 302, and (ii) query string parameters that are not linked or associated with the second identifier, and which the cloud gaming server 304 may use for purposes other than for selecting game play audio data or game play video data or any other form of game play sensory data, from among a set of selectable game play data corresponding to the instance of the cloud based gaming software application, for transmission to client terminal 302. In an example, the query string parameters may include attribution information to inform the cloud gaming server 304 about targeted content source server that requires to be credited for the clicked or selected targeted content.

Step 504 comprises selecting from among a plurality of selectable game play options associated with the identified cloud based gaming application software, a set of game play options identified based on the one or more game play parameters that are associated with the second identifier and that have been received from the client terminal 302. The selected one or more game play options may determine selection of game play audio data or game play video data or any other form of game play sensory data, from among a set of selectable game play data corresponding to the instance of the cloud based gaming software application, for transmission to client terminal 302. In an embodiment, the selected one or more game play options may include any one or more of a selected game play avatar, a selected game play profile, a selected game play map or game play level, selected game play equipment for a game play avatar, or selected game play skills or attributes for a game play avatar.

Step 506 comprises initiating a cloud based instance of the cloud based gaming software application, wherein the cloud based instance of said cloud based gaming software application is initiated after the cloud gaming server 304 receives the data transmitted from the client terminal 302 at step 502.

Step 508 comprises initiating streaming of game play data generated by the cloud based instance of the cloud based gaming software application, from the cloud gaming server 304 to the client terminal 302, wherein the streamed game play data has been determined or selected based on the set of game play options selected at step 504. In an embodiment, one or more of game play audio data or game play video data or any other form of game play sensory data, that is streamed from cloud gaming server 304 to client terminal 302 at step 508 is determined or selected based on the set of game play options selected at step 504.

In view of the above, it would be understood that based on the data parameters that are included within the embedded link (within the displayed instance of targeted content) that are received at cloud gaming server 304, the cloud gaming server 304 is enabled to initiate execution of an instance of the cloud based gaming software application identified by such data parameter(s), and is further enabled to initiate a communication session between with the client terminal 302—wherein game play data is transmitted between cloud gaming server 304 and client terminal 302 over the initiated communication session.

The one or more game play parameters (that are associated with the second identifier) which are included within the embedded link, and which are subsequently received by the cloud gaming server 304, may comprise any one or more parameters that cloud gaming server 304 is configured to use for selecting game play audio data or game play video data or any other form of game play sensory data, from among a set of selectable game play data corresponding to the instance of the cloud based gaming software application, for transmission to client terminal 302. By selectively including such game play parameters within the embedded link in targeted content for a cloud based gaming software application, and by transmitting such game play parameters to a cloud gaming server 304 when the embedded link is clicked, selected or otherwise activated, the invention enables the cloud gaming server 304 to implement selective fine grained control of game play data that is delivered from the cloud gaming server 304 to a client terminal 302 during a cloud based gaming session.

Further, it will be noted that the cloud gaming server 304 may optionally receive one or more query string based parameters that are not associated with the second identifier. These query string based parameters may include parameters that are not specific to the cloud based gaming software application that is being executed and/or to selection of game play data associated with the cloud based gaming software—and may instead include any other parameters or arguments that may be optionally passed to the cloud gaming server 304. It will be noted that these query string based parameters are not associated with the second identifier—thereby enabling the cloud gaming server to differentiate between (i) parameters that are associated with the second identifier and which cloud gaming server 304 is therefore configured to use for selecting game play audio data or game play video data or any other form of game play sensory data, from among a set of selectable game play data corresponding to the instance of the cloud based gaming software application, for transmission to client terminal 302, and (ii) parameters that are not associated with the second identifier, and which cloud gaming server 304 may use for purposes other than for selecting game play audio data or game play video data or any other form of game play sensory data, from among a set of selectable game play data corresponding to the instance of the cloud based gaming software application, for transmission to client terminal 302—for example parameters that include attribution information to inform the cloud gaming server 304 about the targeted content source server 306 that requires to be credited for the clicked or selected instance of targeted content.

By implementing the teachings discussed in FIGS. 3 to 5 above, the invention provides effective solutions for advertising or targeted delivery of game content to users for creating awareness and interest in new cloud based gaming software applications or new offerings within cloud based gaming software applications. The systems and methods of the present invention enable users who are presented with targeted content relating to cloud based gaming software applications to be able to experience the targeted content in an efficient, interactive and user friendly manner—while simultaneously restricting the user experience only to the targeted content, and avoiding having the user navigate the entire game play interface or the entire game play flow in chronological order. The invention offers solutions for using embedded links and/or deep links within targeted content delivered to client terminals, for the purposes of implementing fine grained gaming session control between a cloud gaming server and the client control for cloud based delivery of software gaming services to the client terminal.

Figure 6:
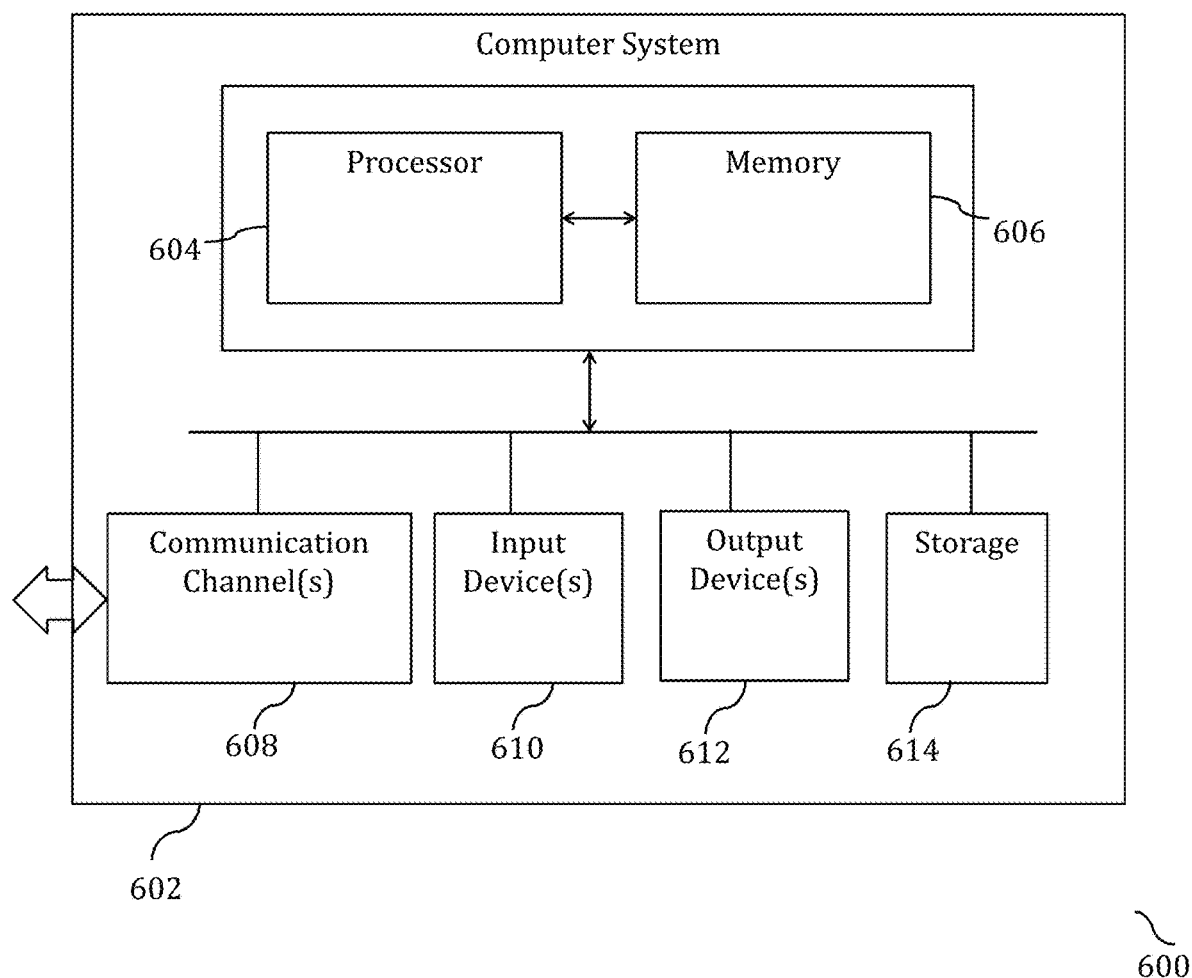
FIG. 6 illustrates an exemplary system for implementing the present invention.

FIG. 6 illustrates an exemplary system for implementing the present invention.

FIG. 6 illustrates an exemplary system 600 for implementing the present invention. The illustrated system 600 comprises computer system 602 which in turn comprises one or more processors 604 and at least one memory 606. Processor 604 is configured to execute program instructions—and may be a real processor or a virtual processor. It will be understood that computer system 602 does not suggest any limitation as to scope of use or functionality of described embodiments. The computer system 602 may include, but is not be limited to, one or more of a general-purpose computer, a programmed microprocessor, a microcontroller, an integrated circuit, and other devices or arrangements of devices that are capable of implementing the steps that constitute the method of the present invention. Exemplary embodiments of a computer system 602 in accordance with the present invention may include one or more servers, desktops, laptops, tablets, smart phones, mobile phones, mobile communication devices, tablets, phablets and personal digital assistants. In an embodiment of the present invention, the memory 606 may store software for implementing various embodiments of the present invention. The computer system 602 may have additional components. For example, the computer system 602 may include one or more communication channels 608, one or more input devices 610, one or more output devices 612, and storage

614. An interconnection mechanism (not shown) such as a bus, controller, or network, interconnects the components of the computer system 602. In various embodiments of the present invention, operating system software (not shown) provides an operating environment for various softwares executing in the computer system 602 using a processor 604, and manages different functionalities of the components of the computer system 602.

The communication channel(s) 608 allow communication over a communication medium to various other computing entities. The communication medium provides information such as program instructions, or other data in a communication media. The communication media includes, but is not limited to, wired or wireless methodologies implemented with an electrical, optical, RF, infrared, acoustic, microwave, Bluetooth or other transmission media.

The input device(s) 610 may include, but is not limited to, a touch screen, a keyboard, mouse, pen, joystick, trackball, a voice device, a scanning device, or any another device that is capable of providing input to the computer system 602. In an embodiment of the present invention, the input device(s) 610 may be a sound card or similar device that accepts audio input in analog or digital form. The output device(s) 612 may include, but not be limited to, a user interface on CRT, LCD, LED display, or any other display associated with any of servers, desktops, laptops, tablets, smart phones, mobile phones, mobile communication devices, tablets, phablets and personal digital assistants, printer, speaker, CD/DVD writer, or any other device that provides output from the computer system 602.

The storage 614 may include, but not be limited to, magnetic disks, magnetic tapes, CD-ROMs, CD-RWs, DVDs, any types of computer memory, magnetic stripes, smart cards, printed barcodes or any other transitory or non-transitory medium which can be used to store information and can be accessed by the computer system 602. In various embodiments of the present invention, the storage 614 may contain program instructions for implementing any of the described embodiments.

In an embodiment of the present invention, the computer system 602 is part of a distributed network or a part of a set of available cloud resources.

The present invention may be implemented in numerous ways including as a system, a method, or a computer program product such as a computer readable storage medium or a computer network wherein programming instructions are communicated from a remote location.

The present invention may suitably be embodied as a computer program product for use with the computer system 602. The method described herein is typically implemented as a computer program product, comprising a set of program instructions that is executed by the computer system 602 or any other similar device. The set of program instructions may be a series of computer readable codes stored on a tangible medium, such as a computer readable storage medium (storage 614), for example, diskette, CD-ROM, ROM, flash drives or hard disk, or transmittable to the computer system 602, via a modem or other interface device, over either a tangible medium, including but not limited to optical or analogue communications channel(s) 608. The implementation of the invention as a computer program product may be in an intangible form using wireless techniques, including but not limited to microwave, infrared, Bluetooth or other transmission techniques. These instructions can be preloaded into a system or recorded on a storage medium such as a CD-ROM, or made available for downloading over a network such as the Internet or a mobile telephone network. The series of computer readable instructions may embody all or part of the functionality previously described herein.

The invention accordingly enables implementing of fine grained gaming session control between a cloud gaming server and the client control for cloud based delivery of software gaming services to the client terminal.

While the exemplary embodiments of the present invention are described and illustrated herein, it will be appreciated that they are merely illustrative. It will be understood by those skilled in the art that various modifications in form and detail may be made therein without departing from the scope of the invention as defined by the appended claims. Additionally, the invention illustratively disclose herein suitably may be practiced in the absence of any element which is not specifically disclosed herein—and in a particular embodiment specifically contemplated, is intended to be practiced in the absence of any element which is not specifically disclosed herein.

The invention claimed is:

1. A method for fine grained cloud gaming session control comprising:
   receiving at a client terminal, targeted content, wherein the targeted content comprises:
     game advertising content corresponding to a cloud based gaming software application, for display on a client terminal display; and
     an embedded network communication link comprising:
       a URL identifying a network location of a cloud gaming server at which an instance of the cloud based gaming software application is capable of being instantiated, and from which game content corresponding to the instance of the cloud based gaming software application can be streamed to the client terminal subsequent to instantiation;
       a first identifier comprising a cloud based gaming software application identifier that uniquely identifies the cloud based gaming software application;
       a second identifier, wherein said second identifier is recognizable by the cloud gaming server as an identifier of deep link parameter(s); and
       one or more game play parameters that are associated with the second identifier, wherein said game play parameters enable selection of game play sensory data generated by the instance of the cloud based gaming software application, for transmission from the cloud gaming server to the client terminal;
   rendering on the client terminal, a clickable instance of the game advertising content, wherein the rendered clickable instance of the game advertising content includes the embedded network communication link; and
   responding to a user input that clicks or selects the clickable instance of the game advertising content, by:
     transmitting from the client terminal to the cloud gaming server identified by the URL, data from within the game advertising content, the transmitted data comprising:
       the first identifier;
       the second identifier;
       and the one or more game play parameters;
     instantiating at the cloud gaming server, a new instance of the cloud based gaming software application, wherein the instantiating of the new instance of the cloud based gaming software application is based on the first identifier, the second identifier, and the one or more game play parameters transmitted from the client terminal; and initiating streaming of game play data generated by the cloud based instance of the cloud based gaming software application, from the cloud gaming server to the client terminal, wherein the streamed game play data is determined by the one or more game play parameters.

2. The method as claimed in claim 1, wherein the cloud gaming server implements, the steps of:

selecting from among a plurality of selectable game play options associated with the identified cloud based gaming application software, a set of game play options identified based on the one or more game play parameters that have been received from the client terminal;

generating game play data for streaming from the cloud gaming server to the client terminal, wherein the streamed game play data is determined by the selected set of game play options.

3. The method as claimed in claim 1, wherein the embedded network communication link further comprises one or more query string based parameters that are not linked or associated with the second identifier.

4. The method as claimed in claim 1, wherein the one or more game play parameters that are included within the embedded network communication link comprise any one or more parameters that the cloud gaming server is configured to rely on for selecting game play audio data or game play video data or game play sensory data, from among a set of selectable game play data, for transmission to the client terminal.

5. The method as claimed in claim 3, wherein the one or more query string based parameters that are not linked or associated with the second identifier comprise parameters that include attribution information that identifies to the cloud gaming server, a targeted content source server that requires to be credited for the clickable instance of the game advertising content that has been rendered on the client terminal.

6. A system for fine grained cloud gaming session control comprising a processor implemented client terminal, configured for performing the steps of:

receiving from a targeted content source server, targeted content, wherein the targeted content comprises:

game advertising content corresponding to a cloud based gaming software application, for display on a client terminal display; and an embedded network communication link comprising:

a URL identifying a network location of a cloud gaming server at which an instance of the cloud based gaming software application is capable of being instantiated, and from which game content corresponding to the instance of the cloud based gaming software application can be streamed to the client terminal subsequent to instantiation;

a first identifier comprising a cloud based gaming software application identifier that uniquely identifies the cloud based gaming software application;

a second identifier, wherein said second identifier is recognizable by the cloud gaming server as an identifier of deep link parameter(s); and one or more game play parameters that are associated with the second identifier, wherein said game play parameters enable selection of game play sensory data generated by the instance of the cloud based gaming software application, for transmission from the cloud gaming server to the client terminal;

rendering a clickable instance of the game advertising content, wherein the rendered clickable instance of the game advertising content includes the embedded network communication link; and responding to a user input that clicks or selects the clickable instance of the game advertising content, by:

transmitting from the client terminal to the cloud gaming server identified by the URL, data from within the game advertising content, the transmitted data comprising:

the first identifier;

the second identifier;

and the one or more game play parameters;

instantiating at the cloud gaming server, a new instance of the cloud based gaming software application, wherein the instantiating of the new instance of the cloud based gaming software application is based on the first identifier, the second identifier, and the one or more game play parameters transmitted from the client terminal; and initiating streaming of game play data generated by the cloud based instance of the cloud based gaming software application, from the cloud gaming server to the client terminal, wherein the streamed game play data is determined by the one or more game play parameters.

7. The system as claimed in claim 6, wherein the cloud gaming server is configured for performing the steps of:

selecting from among a plurality of selectable game play options associated with the identified cloud based gaming application software, a set of game play options identified based on the one or more game play parameters that have been received from the client terminal;

generating game play data for streaming from the cloud gaming server to the client terminal, wherein the streamed game play data is determined by the selected set of game play options.

8. The system as claimed in claim 6, wherein the embedded network communication link further comprises one or more query string based parameters that are not linked or associated with the second identifier.

9. The system as claimed in claim 8, wherein the one or more game play parameters that are included within the embedded network communication link comprise any one or more parameters that the cloud gaming server is configured to rely on for selecting game play audio data or game play video data or game play sensory data, from among a set of selectable game play data, for transmission to the client terminal.

10. The system as claimed in claim 8, wherein the one or more query string based parameters that are not linked or associated with the second identifier comprise parameters that include attribution information that identifies to the cloud gaming server, a targeted content source server that requires to be credited for the clickable instance of the game advertising content that has been rendered on the client terminal.

11. A computer program product for fine grained cloud gaming session control, comprising a non-transitory computer readable medium having a computer readable program code embodied therein, the computer readable program code comprising instructions for implementing the steps of:

receiving at a client terminal, targeted content, wherein the targeted content comprises:

game advertising content corresponding to a cloud based gaming software application, for display on a client terminal display; and an embedded network communication link comprising:
- a URL identifying a network location of a cloud gaming server at which an instance of the cloud based gaming software application is capable of being instantiated, and from which game content corresponding to the instance of the cloud based gaming software application can be streamed to the client terminal subsequent to instantiation;
- a first identifier comprising a cloud based gaming software application identifier that uniquely identifies the cloud based gaming software application;
- a second identifier, wherein said second identifier is recognizable by the cloud gaming server as an identifier of deep link parameter(s); and
- one or more game play parameters that are associated with the second identifier, wherein said game play parameters enable selection of game play sensory data generated by the instance of the cloud based gaming software application, for transmission from the cloud gaming server to the client terminal;

rendering on the client terminal, a clickable instance of the game advertising content, wherein the rendered clickable instance of the game advertising content includes the embedded network communication link; and responding to a user input that clicks or selects the clickable instance of the game advertising content, by:

transmitting from the client terminal to the cloud gaming server identified by the URL, data from within the game advertising content, the transmitted data comprising:
- the first identifier;
- the second identifier;
- and the one or more game play parameters;

instantiating at the cloud gaming server, a new instance of the cloud based gaming software application, wherein the instantiating of the new instance of the cloud based gaming software application is based on the first identifier, the second identifier, and the one or more game play parameters transmitted from the client terminal; and initiating streaming of game play data generated by the cloud based instance of the cloud based gaming software application, from the cloud gaming server to the client terminal, wherein the streamed game play data is determined by the one or more game play parameters.

\* \* \* \* \*